(12) United States Patent
Uehara et al.

(10) Patent No.: US 9,400,031 B2
(45) Date of Patent: Jul. 26, 2016

(54) FLYWHEEL ASSEMBLY

(71) Applicant: EXEDY Corporation, Neyagawa-shi, Osaka (JP)

(72) Inventors: Hiroshi Uehara, Neyagawa (JP); Kazuhiro Koshi, Neyagawa (JP)

(73) Assignee: EXEDY Corporation, Osaka (JP)

( * ) Notice: Subject to any disclaimer, the term of this patent is extended or adjusted under 35 U.S.C. 154(b) by 48 days.

(21) Appl. No.: 14/390,651

(22) PCT Filed: May 22, 2013

(86) PCT No.: PCT/JP2013/064199
§ 371 (c)(1),
(2) Date: Oct. 3, 2014

(87) PCT Pub. No.: WO2013/179967
PCT Pub. Date: Dec. 5, 2013

(65) Prior Publication Data
US 2015/0099591 A1    Apr. 9, 2015

(30) Foreign Application Priority Data

May 31, 2012    (JP) .................. 2012-124745

(51) Int. Cl.
*F16F 15/121*    (2006.01)
*F16F 15/134*    (2006.01)
*F16F 15/30*    (2006.01)

(52) U.S. Cl.
CPC ..... *F16F 15/13492* (2013.01); *F16F 15/13453* (2013.01); *F16F 15/30* (2013.01)

(58) Field of Classification Search
CPC .................... F16F 15/13492; F16F 15/13453; F16F 15/30
USPC ................ 464/68.9, 68.92; 192/213
See application file for complete search history.

(56) References Cited

U.S. PATENT DOCUMENTS

| | | | | |
|---|---|---|---|---|
| 5,996,761 A | * | 12/1999 | Teramae | F16H 45/02 192/213 X |
| 8,303,424 B2 | * | 11/2012 | Boelling | F16F 15/13438 464/68.92 X |
| 8,641,537 B2 | * | 2/2014 | Uehara | F16F 15/13469 464/68.92 |
| 8,747,235 B2 | * | 6/2014 | Takikawa | F16H 45/02 464/68.9 X |

FOREIGN PATENT DOCUMENTS

| | | |
|---|---|---|
| JP | S60-003328 U | 1/1985 |
| JP | 2007-247723 A | 9/2007 |
| JP | 2008-138885 A | 6/2008 |
| JP | 2010-053936 A | 3/2010 |
| JP | 2011-099565 A | 5/2011 |
| JP | 2011-220409 A | 11/2011 |
| JP | 2011-236941 A | 11/2011 |

* cited by examiner

*Primary Examiner* — Gregory Binda
(74) *Attorney, Agent, or Firm* — Global IP Counselors, LLP

(57) ABSTRACT

A flywheel assembly includes a first elastic member disposed on a side to which an acceleration-side power of an engine is outputted and a second elastic member disposed in series with the first elastic member. The second elastic member exerts a transmission torque having a magnitude less than that of a transmission torque exerted by the first elastic member. An end sheet member includes a first end sheet member and a second end sheet member. The first end sheet member is slidable against a first rotary member. The second end sheet member is slidable against the first rotary member. A first intermediate sheet member included in an intermediate sheet member is disposed between the first elastic member and the second elastic member and is slidable against the first rotary member.

8 Claims, 18 Drawing Sheets

FLYWHEEL ASSEMBLY

CROSS-REFERENCE TO RELATED APPLICATIONS

This application is a U.S. National Stage application of International Application No. PCT/JP2013/064199, filed May 22, 2013, which claims priority to Japanese Patent Application No. 2012-124745, filed in Japan on May 31, 2012, the entire disclosure of which is hereby incorporated by reference.

BACKGROUND

1. Field of Invention

The present invention relates to a flywheel assembly including a damper mechanism.

2. Background Information

A variety of devices are embedded in a drive train of a vehicle to transmit power generated in an engine. For example, a clutch device and a flywheel assembly are assumable as these types of devices. A damper mechanism has been used for these types of devices to attenuate rotational vibrations (see e.g., Japanese Laid-open Patent Application Publication No. JP-A-2011-220409, Japanese Laid-open Patent Application Publication No. JP-A-2010-053936, and Japanese Laid-open Patent Application Publication No. JP-A-2008-138885).

SUMMARY

A well-known flywheel assembly includes a first flywheel, a second flywheel and a damper mechanism. The first flywheel is fixed to a crankshaft of an engine. The damper mechanism elastically couples the first flywheel and the second flywheel in a rotational direction.

Specifically, the damper mechanism includes a plurality of coil springs elastically coupling the first flywheel and the second flywheel in the rotational direction. The plural coil springs are disposed in a bilaterally symmetric manner to act in series between the first flywheel and the second flywheel. The ends of the coil springs are supported by spring sheets. In the damper mechanism structured as described above, a bilaterally symmetrical torsional characteristic is formed.

In general, a relatively large torsion angle is formed in rapid deceleration or so forth. For example, when a gear stage is shifted down and a clutch is rapidly engaged in deceleration, impact by the gear ratio of a transmission is increased and grip of tires against the ground becomes better due to forward movement of the weight of a vehicle. Thus, a large impact torque is produced. At this time, chances are that the aforementioned torsional characteristic exerts insufficient resonance inhibition performance in a large torsion angular range.

On the other hand, when the engine starts rotating from its deactivated state, the frequency of vibration of the flywheel assembly passes through a resonance frequency (normal mode). In this case, the flywheel assembly exhibits high responsiveness in the resonance frequency. Thus, chances are that the aforementioned torsional characteristic exerts insufficient resonance inhibition performance in the large torsion angular range.

It is an object of the present invention to provide a flywheel assembly whereby resonance inhibition performance can be enhanced on the negative side in a torsional characteristic.

A flywheel assembly includes a first rotary member, a second rotary member, a first elastic member, a second elastic member, an end sheet member and an intermediate sheet member. The second rotary member is disposed to be rotatable with respect to the first rotary member.

The first elastic member is disposed on a side to which an acceleration-side power of an engine is outputted. The first elastic member is configured to elastically couple the first rotary member and the second rotary member in a rotational direction. The second elastic member is configured to elastically couple the first rotary member and the second rotary member in the rotational direction. The second elastic member is disposed in series with the first elastic member. The second elastic member is configured such that a magnitude of a transmission torque of the second elastic member is less than a magnitude of a transmission torque of the first elastic member.

The end sheet member includes a first end sheet member and a second end sheet member. The first end sheet member is disposed between the first elastic member and at least either of the first rotary member and the second rotary member. The first end sheet member is configured to be slidable against the first rotary member. The second end sheet member is disposed between the second elastic member and at least either of the first rotary member and the second rotary member. The second end sheet member is configured to be slidable against the first rotary member.

The intermediate sheet member includes a first intermediate sheet member. The first intermediate sheet member is disposed between the first elastic member and the second elastic member. The first intermediate sheet member is configured to be slidable against the first rotary member.

In the present flywheel assembly, when power of the engine is inputted into the first rotary member, the first elastic member and the second elastic member are configured to be compressed between adjacent sheet members (the end sheet member and/or the intermediate sheet member) in accordance with the torsion angle (rotational amount) of the first rotary member with respect to the second rotary member. Here, the transmission torque exerted by the second elastic member has a magnitude less than that of the transmission torque exerted by the first elastic member. Hence, when the torsion angle is increased, the sheet members (the end sheet member and/or the intermediate sheet member) disposed on the both sides of the second elastic member get closer to each other and will be contacted to each other at any point in time later.

In the flywheel assembly as described above, when the first rotary member is rotated in a power input direction (to an acceleration side), i.e., when the first rotary member is twisted to a drive side (a positive side; an R2 side in FIG. 1), and if the torsional torque is small, the sheet members disposed on the both sides of the first elastic member (the end sheet member and/or the intermediate sheet member; referred to as sheet members for the first elastic member) and the sheet members disposed on the both sides of the second elastic member (the end sheet member and/or the intermediate sheet member; referred to as sheet members for the second elastic member) are slid against the first rotary member. Further, when the torsional torque is increased and the sheet members for the second elastic member are contacted to each other, only the sheet members for the first elastic member are slid against the first rotary member whereas the sheet members for the second elastic member are not slid against the first rotary member.

By contrast, when the first rotary member is rotated oppositely to the power input direction (to a deceleration side), i.e., when the first rotary member is twisted to an anti-drive side (a negative side; an R1 side in FIG. 1), and if the torsional torque is small, the sheet members for the first elastic member and those for the second elastic member are slid against the first rotary member. When the torsional torque is then increased and the sheet members for the second elastic member are contacted to each other, the sheet members for the second elastic member are slid against the first rotary member together with the sheet members for the first elastic member while being contacted to each other.

In the present flywheel assembly, when the torsional torque is increased on the positive side in the torsional characteristic, only the sheet members for the first elastic member are slid against the first rotary member. By contrast, when the torsional torque is increased on the negative side in the torsional characteristic, both of the sheet members for the first elastic member and those for the second elastic member are slid against the first rotary member. Accordingly, in the present flywheel assembly, the hysteresis torque on the positive side is less than that on the negative side in the torsional characteristic.

In other words, the hysteresis torque on the positive side is less than that on the negative side in the torsional characteristic. Hence, even when variation in rotation of the engine is caused on the positive side in the torsional characteristic, the variation in rotation of the engine becomes unlikely to be transmitted to the transmission. On the other hand, the hysteresis torque on the negative side is greater than that on the positive side. Hence, even when the torsion angle is increased on the negative side in rapid deceleration, resonance or so forth, responsiveness to input can be reduced. Thus, the present flywheel assembly can provide appropriate resonance inhibition performance in accordance with the state of action of the flywheel assembly.

The first elastic member is one of a plurality of first elastic members and adjacent ones of the first elastic members are disposed in series. The intermediate sheet member further includes a second intermediate sheet member. The second intermediate sheet member is disposed between the adjacent ones of the first elastic members.

In this case, the plural first elastic members are disposed in series. Thus, a wide torsion angle can be reliably formed.

The transmission torque exerted by at least any one of the first elastic members has a magnitude less than a magnitude of the transmission torque exerted by each of the rest of the first elastic members.

In this case, a multi-stage characteristic can be easily formed due to the configuration that the transmission torque exerted by at least any one of the first elastic members has a magnitude less than that of the transmission torque exerted by each of the rest of the first elastic members.

The second elastic member is one of a plurality of second elastic members and adjacent ones of the second elastic members are disposed in series. The intermediate sheet member further includes a third intermediate sheet member. The third intermediate sheet member is disposed between the adjacent ones of the second elastic members.

In this case, the plural second elastic members are disposed in series. Thus, a wide torsion angle can be reliably formed.

The transmission torque exerted by at least any one of the second elastic members has a magnitude less than a magnitude of the transmission torque exerted by each of the rest of the second elastic members.

In this case, a multi-stage characteristic can be easily formed due to the configuration that the transmission torque exerted by at least any one of the second elastic members has a magnitude less than that of the transmission torque exerted by each of the rest of the second elastic members.

Amongst the sheet members, adjacent ones disposed on the both sides of the second elastic member are configured to be contacted to each other when a rotational angle of the second rotary member with respect to the first rotary member becomes a predetermined angle.

In this case, in a region of the torsional characteristic that the torsion angle (rotational angle) is greater than a predetermined angle, the sheet members disposed on the both sides of the second elastic member are configured to be contacted to each other, and therefore, torsional stiffness is increased. Further, in the region that the torsion angle is greater than the predetermined angle, input torque is also large. Especially, when the rotary member is twisted to the negative side, the sheet members disposed on the both sides of the second elastic member contribute to attenuation while being contacted to each other. Therefore, hysteresis torque is enhanced in the region that the torsion angle is greater than the predetermined torsion angle on the negative side. In other words, as described above, hysteresis torque can be enhanced when the torsion angle is increased on the negative side. In short, it is possible to enhance resonance inhibition performance on the negative side in the torsional characteristic.

On the other hand, in a region that the torsion angle is less than the predetermined angle in the torsional characteristic, the sheet members disposed on the both sides of the second elastic member are not contacted to each other, and input torque is small. Hence, hysteresis torque attributed to the sheet members is small. Thus, in a normal condition, variation in rotation of the engine and so forth become unlikely to be transmitted to the transmission by configuring the rotary member to be actuated in the range that the torsion angle is less than the predetermined torsion angle on the negative side.

In other words, when the torsion angle is small (e.g., when the rotary member is normally actuated), variation in rotation of the engine can be prevented from being transmitted to the transmission by reducing the hysteresis torque in the torsional characteristic. By contrast, when the torsion angle is large on the negative side (e.g., in rapid deceleration or in resonance), the hysteresis torque can be enhanced. Hence, responsiveness to input can be reduced.

Thus, the present flywheel assembly can provide appropriate attenuation performance and resonance inhibition performance in accordance with the state of action of the flywheel assembly.

According to the present invention, it is possible to provide a flywheel assembly whereby resonance inhibition performance can be enhanced on the negative side in a torsional characteristic.

DETAILED DESCRIPTION OF EXEMPLARY EMBODIMENTS

First Exemplary Embodiment

Entire Structure

Figure 2:
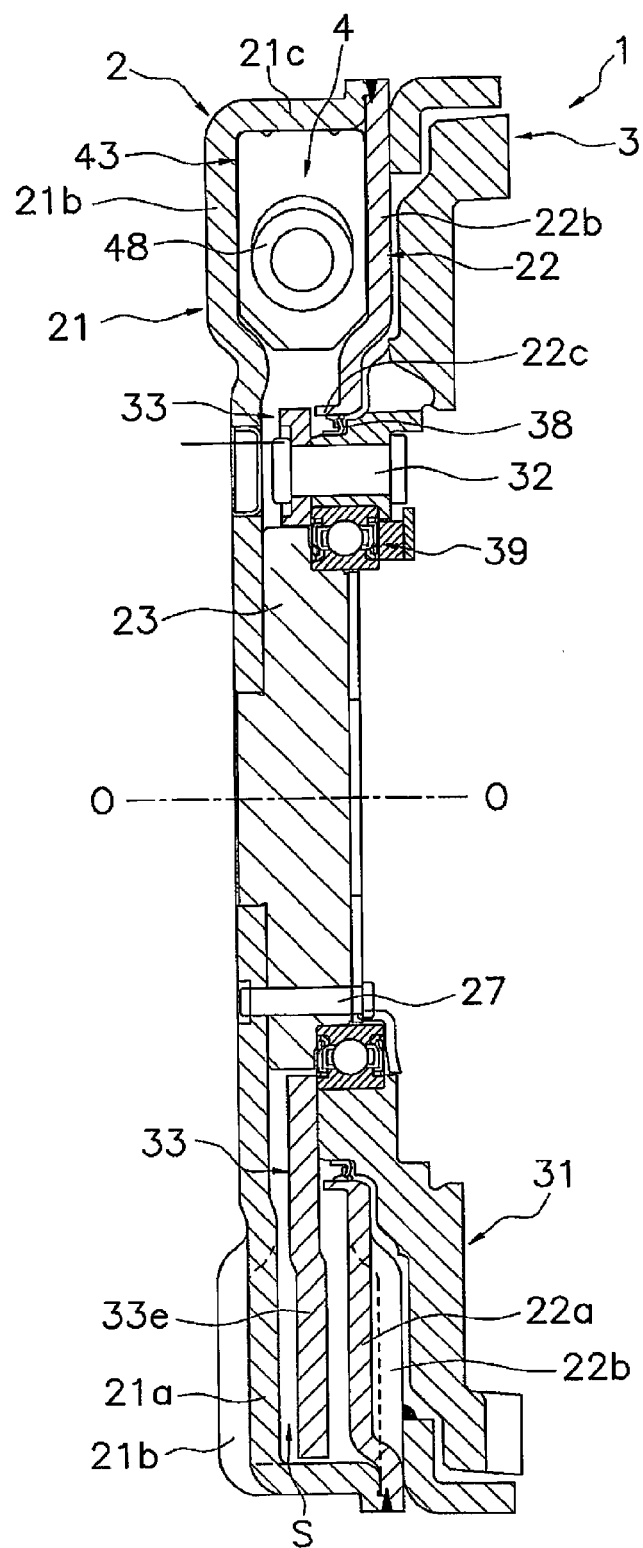
FIG. 2 is a cross-sectional view of FIG. 1 taken along a line II-II.
Figure 3:
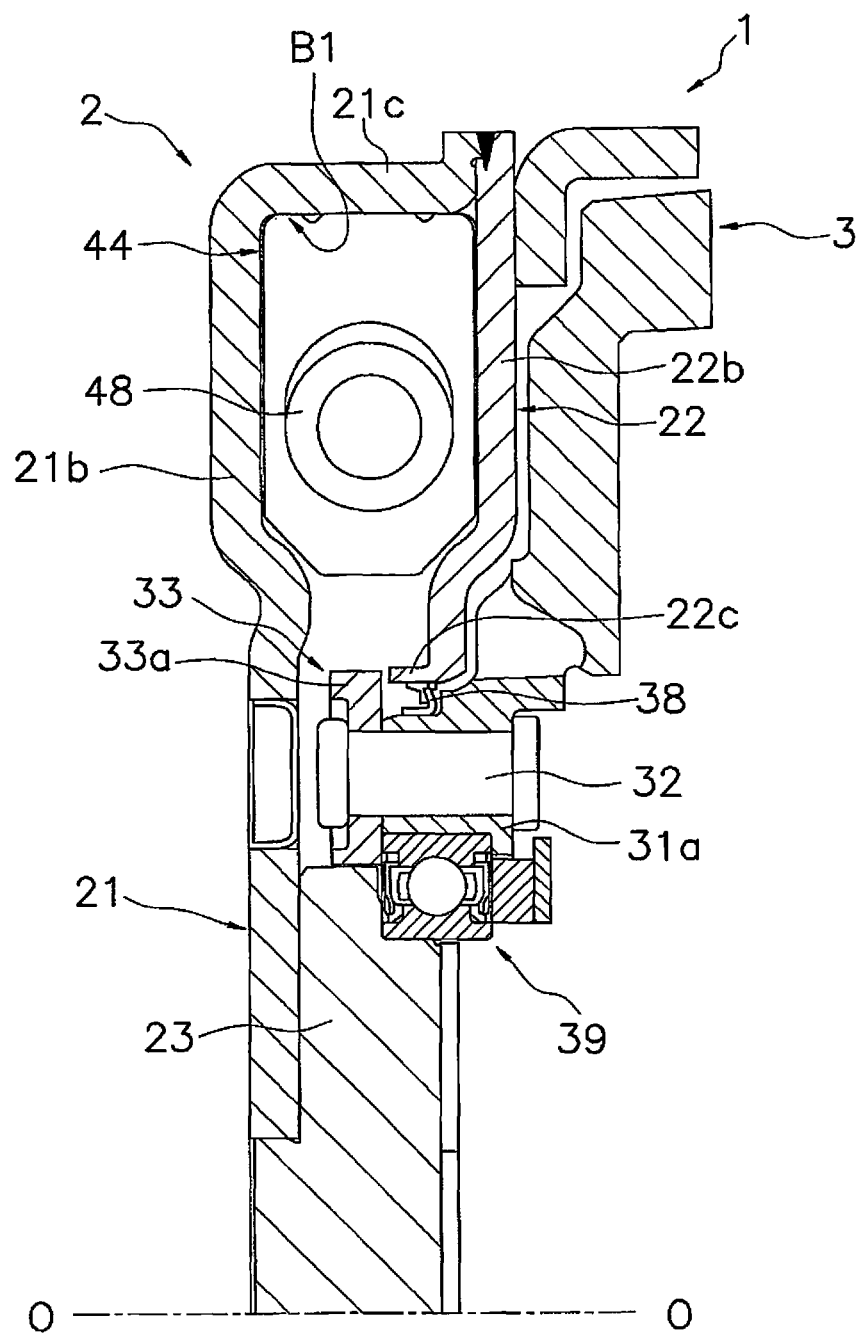
FIG. 3 is a partial enlarged view of FIG. 2.

Using FIGS. 1 to 3, explanation will be made for a flywheel assembly 1.

The flywheel assembly 1 is a device for smoothly transmitting power generated in an engine to a transmission through a clutch device (not illustrated in the drawings). As illustrated in FIGS. 1 and 2, the flywheel assembly 1 includes a first flywheel 2 (an exemplary first rotary member), a second flywheel 3 (an exemplary second rotary member) and a damper mechanism 4.

The flywheel assembly 1 is herein structured such that transmission torque of each second spring 48 is set to be less than that of each first spring 49. It should be noted that the term "transmission torque" is used for expressing a torque by which actuation of each of the springs 49 and 48 is disabled.

First Flywheel

The first flywheel 2 is a member into which power generated in the engine is inputted. The first flywheel 2 is fixed to a crankshaft (not illustrated in the drawings) of the engine. As illustrated in FIGS. 1 to 3, the first flywheel 2 includes a first plate 21, a second plate 22 and a support member 23.

The first plate 21 has a first plate body 21a, two first lateral parts 21b and a tubular part 21c axially extending from the outer peripheral part of the first plate body 21a and that of each first lateral part 21b.

The first lateral parts 21b are parts bulging toward the engine than the first plate body 21a and are shaped by means of, for instance, stamping. The two first lateral parts 21b are disposed at equal pitches in the rotational direction. Each first lateral part 21b is formed in a range corresponding to two first springs 49 (to be described) and two second springs 48 (to be described).

The second plate 22 is an annular member fixed to the tubular part 21c and has a second plate body 22a, two second lateral parts 22b and an inner tubular part 22c.

The second lateral parts 22b are parts bulging toward the transmission than the second plate body 22a and are shaped by means of, for instance, stamping. The two second lateral parts 22b are disposed at equal pitches in the rotational direction. Each second lateral part 22b is formed in a range corresponding to two first springs 49 and two second springs 48.

A relatively large space for disposing the first springs 49 and the second springs 48 can be formed by disposing the second lateral parts 22b in opposition to the first lateral parts 21b in the outer peripheral part of the first flywheel 2. Further, the ends of each first lateral part 21b in the rotational direction and those of each second lateral part 22b in the rotational direction are contactable to first spring sheets 44 (to be described) in the rotational direction. The first spring sheets 44 are supported by each first lateral part 21b and each second lateral part 22b in the rotational direction. The inner tubular part 22c is a tubular part extending from the inner peripheral part of the second plate body 22a toward the engine and is contacted to a seal ring 38.

The support member 23 is fixed to the first plate 21 by, for instance, rivets 27.

Second Flywheel

The second flywheel 3 is disposed to be rotatable with respect to the first flywheel 2. The second flywheel 3 has a second flywheel body 31 and an output plate 33. The output plate 33 is fixed to the second flywheel body 31 by rivets 32. The second flywheel 3 is supported by a bearing 39 to be rotatable with respect to the first flywheel 2.

The second flywheel body 31 is an annular member disposed on the transmission side of the second plate 22. The output plate 33 is disposed within an accommodation space S and is fixed to the second flywheel body 31. As illustrated in FIG. 1, the output plate 33 has a body 33a having an annular shape and two transmission parts 33e extending from the body 33a in the radial direction. The body 33a is fixed to a support part 31a. Each transmission part 33e is a plate part and is disposed to be contactable to the first spring sheets 44 in the rotational direction. The transmission parts 33e are configured to be disposed axially between the first plate body 21a and the second plate body 22a in a neutral state that power is not being transmitted to a clutch disc assembly through the flywheel assembly 1. Power transmitted to the first flywheel 2 is transmitted to each transmission part 33e through two first springs 49 and two second springs 48.

Damper Mechanism

The damper mechanism 4 is a mechanism elastically coupling the first flywheel 2 and the second flywheel 3 in the rotational direction. The damper mechanism 4 includes four first springs 49 (an exemplary first elastic member), four second springs 48 (an exemplary second elastic member), four first spring sheets 44 (an exemplary end sheet member) and six second spring sheets 43 (an exemplary intermediate sheet member). The damper mechanism 4 also includes the aforementioned first plate 21, second plate 22 and output plate 33.

Figure 1:
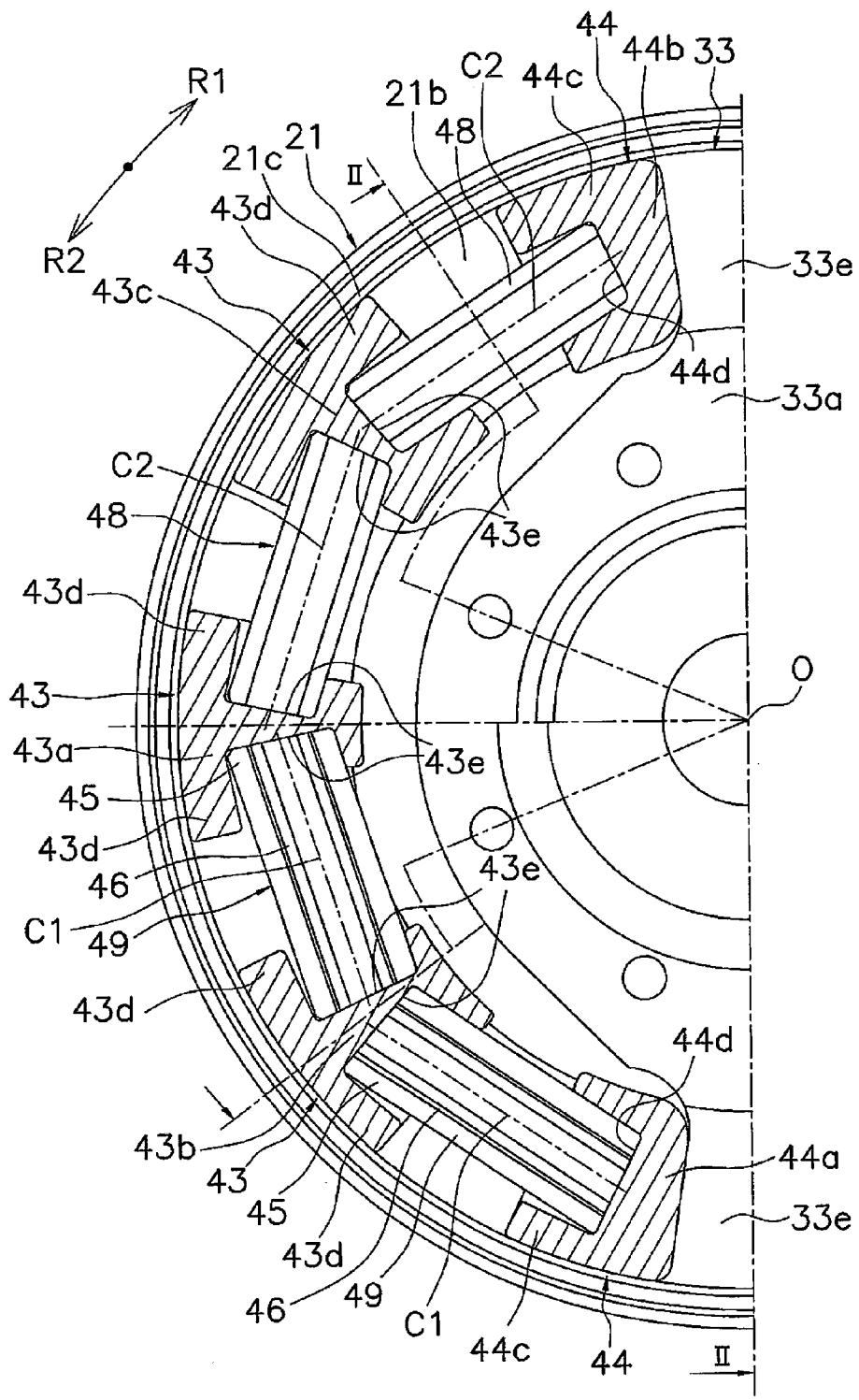
FIG. 1 is a plan view of a flywheel assembly according to a first exemplary embodiment.

As illustrated in FIG. 1, two first springs 49 and two second springs 48 are disposed between the first flywheel 2 and the second flywheel 3 to act in series. Specifically, two first springs 49 are disposed to act in series. Likewise, two second springs 48 are disposed to act in series. Further, two first springs 49 and two second springs 48 are disposed to act in series. Two second springs 48 and two first springs 49 are disposed in a preliminarily compressed state within a first accommodation portion B1 (see FIG. 3) formed by the first lateral part 21*b*, the second lateral part 22*b* and the tubular part 21*c*.

First Springs 49

As illustrated in FIG. 1, the first springs 49 are disposed on a side to which acceleration-side power of the engine is outputted. When described in detail, the first springs 49 are disposed on a side to which power of the engine is outputted when the first flywheel 2 is rotated to a drive side (to the forward; an R2 direction).

Each first spring 49 includes a main spring 45 and a subsidiary spring 46. The subsidiary spring 46 is disposed inside the main spring 45 to act in parallel thereto. Each first spring 49 has a first center axis C1 extending roughly along the rotational direction. Each first spring 49 is elastically deformed along the first center axis C1. The first center axis C1 is herein a center axis set based on the outer contour of the first spring 49.

Second Springs 48

Each second spring 48 is structured such that the transmission torque thereof is less than that of each first spring 49. Here, the stiffness (K2) of each second spring 48 is set to be less than the stiffness (K1) of each first spring 49 (K2<K1). As illustrated in FIG. 1, the outer diameter of each second spring 48 is less than that of each first spring 49 (the outer diameter of the main spring 45). Each second spring 48 has a second center axis C2 extending roughly along the rotational direction. Each second spring 48 is elastically deformed along the second center axis C2. The second center axis C2 is herein a center axis set based on the outer contour of the second spring 48.

First Spring Sheets 44

As illustrated in FIG. 1, a pair of first spring sheets 44 is composed of a first end sheet 44*a* and a second end sheet 44*b*. The first end sheet 44*a* is one of the single pair of first spring sheets 44. The first end sheet 44*a* supports one end of one of the first springs 49. Specifically, the first end sheet 44*a* supports the end of the first spring 49 in both of the radial direction and the axial direction. The second end sheet 44*b* is the other of the single pair of first spring sheets 44. The second end sheet 44*b* supports one end of one of the second springs 48. Specifically, the second end sheet 44*b* supports the end of the second spring 48 in both of the radial direction and the axial direction.

When described in detail, each of the first and second end sheets 44*a* and 44*b* has a tubular shape. Each of the first and second end sheets 44*a* and 44*b* has a tubular part 44*c* and a bottom part 44*d*. The end of the first spring 49 is inserted into the tubular part 44*c* of the first end sheet 44*a*, while the tip of the end of the first spring 49 is contacted to the bottom part 44*d* of the first end sheet 44*a*. On the other hand, the end of the second spring 48 is inserted into the tubular part 44*c* of the second end sheet 44*b*, while the tip of the end of the second spring 48 is contacted to the bottom part 44*d* of the second end sheet 44*b*. Thus, the tubular part 44*c* is formed in each first spring sheet 44, i.e., each of the first and second end sheets 44*a* and 44*b*, and a relevant spring (the first spring 49 or the second spring 48) is mounted to the tubular part 44*c*. Accordingly, each first spring sheet 44 can be entirely enhanced in its strength and can reliably support its relevant spring.

In the neutral state that power is not being transmitted to the clutch disc assembly through the flywheel assembly 1, the first spring sheets 44 are contacted to the rotation-directional ends of the first lateral part 21*b* and those of the second lateral part 22*b* in the rotational direction. Further, the first spring sheets 44 are contactable to the transmission parts 33*e*.

Second Spring Sheet 43

As illustrated in FIG. 1, three second spring sheets 43 are composed of a first intermediate sheet 43*a*, a second intermediate sheet 43*b* and a third intermediate sheet 43*c*. The first intermediate sheet 43*a* is disposed between one of the first springs 49 and one of the second springs 48. For example, the first intermediate sheet 43*a* supports one end of the first spring 49 and that of the second spring 48 in both of the radial direction and the axial direction. The second intermediate sheet 43*b* is disposed between the adjacent first springs 49. For example, the second intermediate sheet 43*b* supports ends of the adjacent first springs 49 in both of the radial direction and the axial direction. The third intermediate sheet 43*c* is disposed between the adjacent second springs 48. For example, the third intermediate sheet 43*c* supports ends of the adjacent second springs 48 in both of the radial direction and the axial direction.

When described in detail, each of the first intermediate sheet 43*a*, the second intermediate sheet 43*b* and the third intermediate sheet 43*c* has a tubular shape. Each of the first intermediate sheet 43*a*, the second intermediate sheet 43*b* and the third intermediate sheet 43*c* has two tubular parts 43*d* and two bottom parts 43*e* respectively formed in the tubular parts 43*d*. The end of the first spring 49 is inserted into one of the tubular parts 43*d* of the first intermediate sheet 43*a*, while the tip of the end of the first spring 49 is contacted to the bottom part 43*e* of the tubular part 93*d*. The end of the second spring 48 is inserted into the other of the tubular parts 43*d* of the first intermediate sheet 43*a*, while the tip of the end of the second spring 48 is contacted to the bottom part 43*e* of the tubular part 43*d*. The ends of the first springs 49 are respectively inserted into the tubular parts 43*d* of the second intermediate sheet 43*b*, while the tips of the ends of the first springs 49 are respectively contacted to the bottom parts 43*e* of the tubular parts 43*d*. The ends of the second springs 48 are respectively inserted into the tubular parts 43*d* of the third intermediate sheet 43*c*, while the tips of the ends of the second springs 48 are respectively contacted to the bottom parts 43*e* of the tubular parts 43*d*.

Thus, the tubular parts 43*d* are formed in each of the second spring sheets 43, i.e., each of the first intermediate sheet 43*a*, the second intermediate sheet 43*b* and the third intermediate sheet 43*c*, and the respective springs (the first springs 49 and/or the second springs 48) are mounted to the tubular parts 93*d*. Accordingly, the second spring sheets 43 can be entirely enhanced in their strength, and can reliably support the respective springs.

It should be noted that in the present exemplary embodiment, the first and second springs 49 and 48 and the first and second spring sheets 44 and 43 are formed such that the intervals among adjacent spring sheets 44 and 43 can be substantially equal to each other. When described in detail, the length of each first spring 49 and that of each second spring 48, and further, the circumferential length of the outer peripheral part of each first spring sheet 44 and that of the outer peripheral part of each second spring sheet 43 are set such that the circumferential intervals among adjacent spring sheets 44 and 43 can be substantially equal to each other.

Actions

Using FIGS. 4 to 8, explanation will be made for an action of the flywheel assembly 1. It should be noted that the flywheel assembly 1 according to the present exemplary embodiment includes two groups of the springs 49 and 48. A single spring group is composed of two first springs 49 and two second springs 48. Explanation will be hereinafter made by focusing on a single spring group in order to make the explanation easy.

Figure 4:
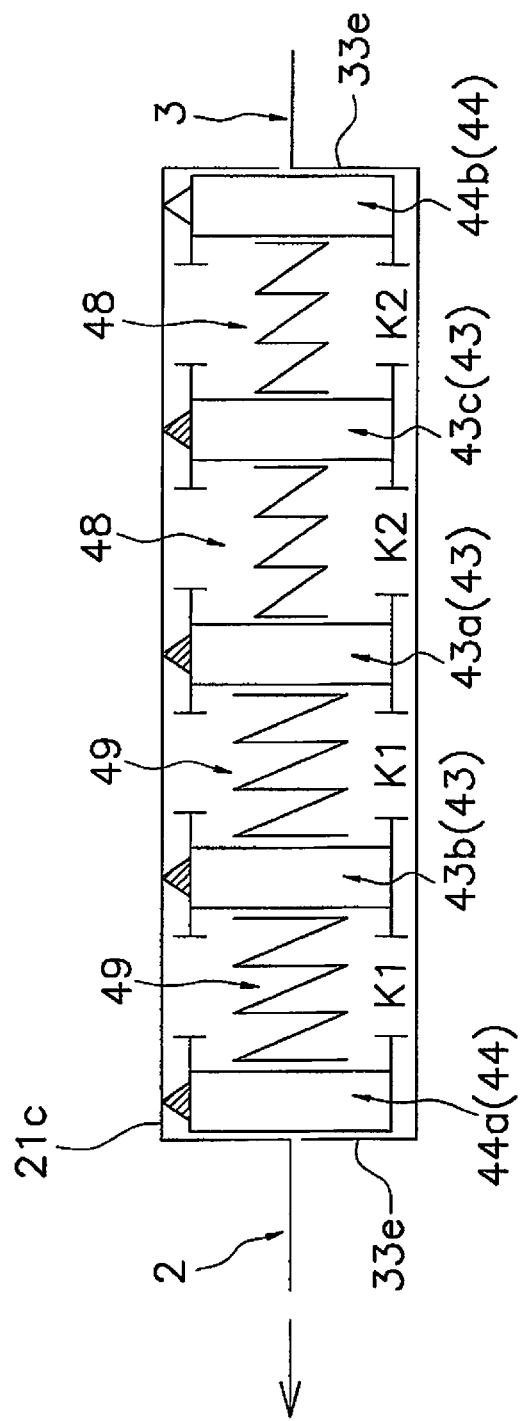
FIG. 4 is a mechanical circuit diagram according to the first exemplary embodiment (a neutral state; a circuit is being actuated in a first stage on a positive side).

The flywheel assembly 1 is set in a state illustrated in FIG. 4 in the neutral state that power is not being transmitted to the clutch disc assembly through the flywheel assembly 1. When the clutch disc assembly is pressed onto the second flywheel 3 in the state, power is transmitted from the engine to the transmission through the flywheel assembly 1 and clutch disc assembly.

Drive-Side Torsional Characteristic

First, power of the engine is inputted into the flywheel assembly 1, and the first flywheel 2 begins to be rotated to the drive side (the positive side; the R2 direction) with respect to the second flywheel 3. Accordingly, the first springs 49 and the second springs 48 begin to be compressed between the first flywheel 2 and the second flywheel 3. When described in more detail, in the state illustrated in FIG. 4, the first springs 49 and the second springs 48 are compressed in the rotational direction between the first flywheel 2 and the transmission parts 33e of the second flywheel 3.

Further, in this case, the first spring sheet 44 (the first end sheet 44a) and the three second spring sheets 43 (the first intermediate sheet 43a, the second intermediate sheet 43b and the third intermediate sheet 93c) are pressed onto and slid against the inner peripheral surface of the tubular part 21c of the first flywheel 2 by means of centrifugal force. Accordingly, rotation directional resistance (i.e., hysteresis torque) is produced by the friction force produced between the respective spring sheets 44 and 43 and the inner peripheral surface of the tubular part 21c of the first flywheel 2. Thus, the hysteresis torque is produced by the friction force between the respective spring sheets 44 and 43 and the first flywheel 2. It should be noted that parts contributing to production of the hysteresis torque (the outer peripheral parts of the spring sheets 44 and 43) are depicted with hatched lines in FIGS. 4 to 7.

Figure 8:
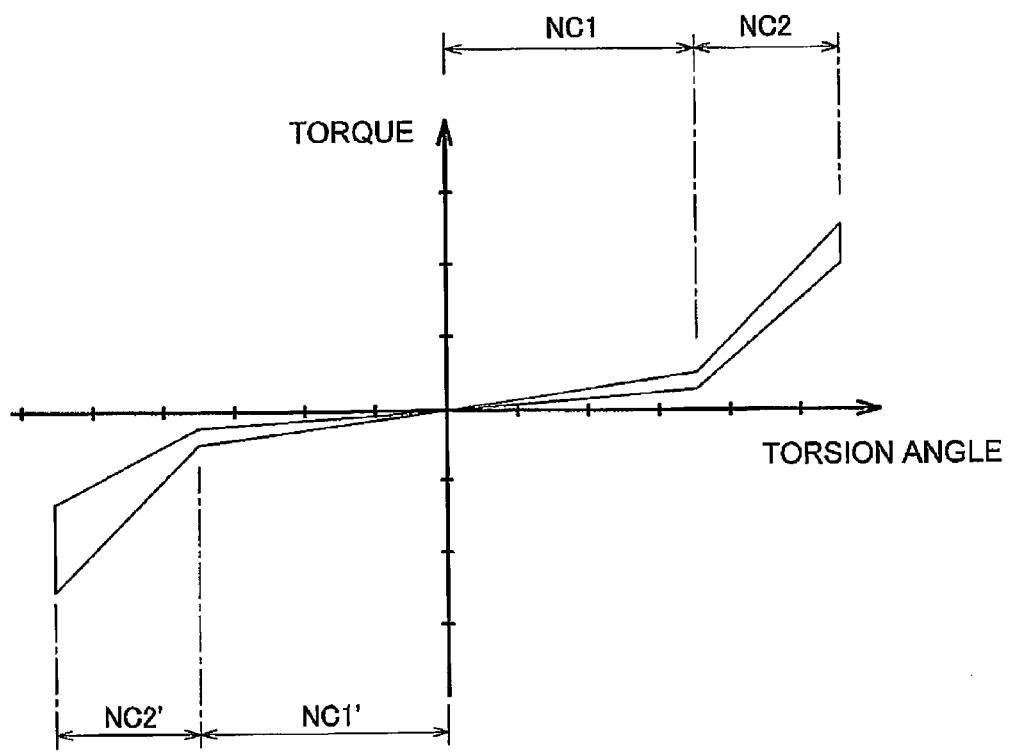
FIG. 8 is a torsional characteristic diagram according to the first exemplary embodiment.

As represented in FIG. 8, a torsional characteristic NC1 in the first stage on the positive side, having a damper effect attributed to the hysteresis torque, is thus formed.

Figure 5:
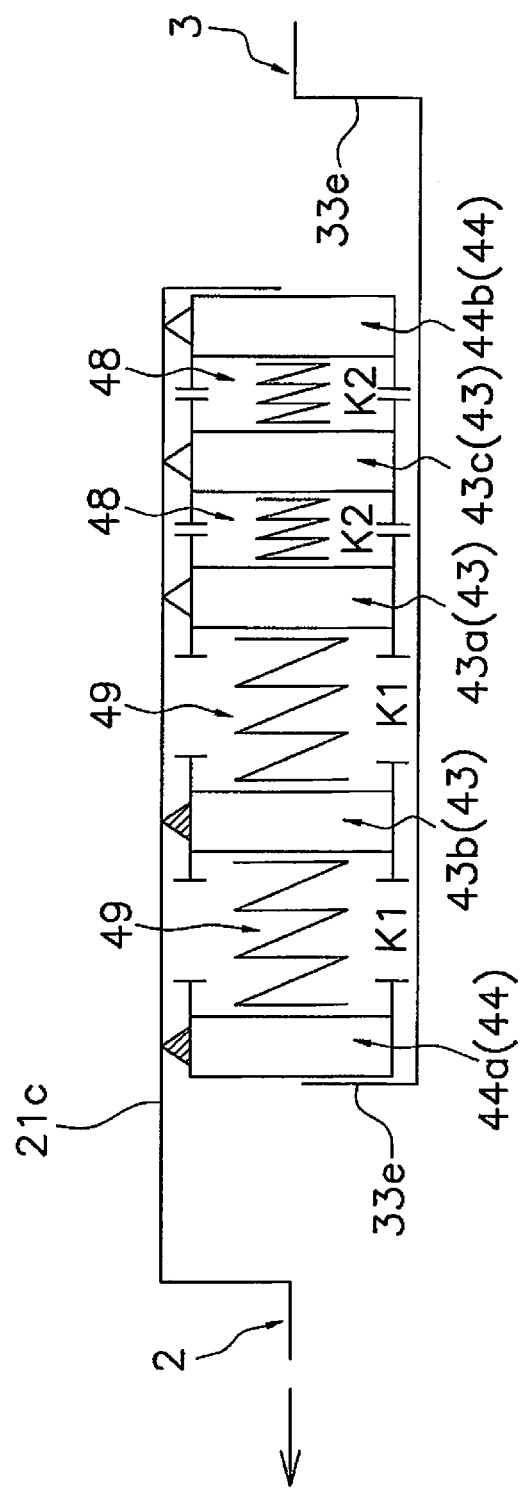
FIG. 5 is a mechanical circuit diagram according to the first exemplary embodiment (the circuit is being actuated in a second stage on the positive side).

Next, when the first flywheel 2 is further rotated with respect to the second flywheel 3, as illustrated in FIG. 5, the tubular part 44c of the second end sheet 44b and one tubular part 43d of the third intermediate sheet 43c are contacted in the rotational direction. Further, the other tubular part 43d of the third intermediate sheet 43c and one tubular part 43d of the first intermediate sheet 43a are contacted in the rotational direction. Specifically, adjacent two tubular parts 43d are contacted to each other at the radially outer parts thereof. Thus, power is transmitted from the first flywheel 2 to the second flywheel 3 while the tubular part 44c of the second end sheet 44b and one tubular part 43d of the third intermediate sheet 43c are contacted; and further, the other tubular part 43d of the third intermediate sheet 43c and one tubular part 43d of the first intermediate sheet 43a are contacted.

In the condition, one first spring 49 disposed between the first end sheet 44a and the second intermediate sheet 43b and the other first spring 49 disposed between the second intermediate sheet 43b and the first intermediate sheet 43a are to be compressed. Further, at this time, the first end sheet 44a and the second intermediate sheet 43b (hatched parts in FIG. 5) are pressed onto and slid against the inner peripheral surface of the tubular part 21c of the first flywheel 2 by means of centrifugal force. Accordingly, hysteresis torque is produced by the friction force produced between the inner peripheral surface of the tubular part 21c of the first flywheel 2 and both of the first end sheet 44a and the second intermediate sheet 43b. Thus, the hysteresis torque is produced by the friction force produced between the first flywheel 2 and both of the first end sheet 44a and the second end sheet 44b.

It should be noted that in this case, three sheets (the second end sheet 44b, the third intermediate sheet 43c and the first intermediate sheet 43a) are not slid against the first flywheel 2. Hence, hysteresis torque is not produced by these sheets. In other words, when the sheet members are contacted on the output side of power, hysteresis torque is not produced by these sheet members. Strictly speaking, there are chances of producing minute hysteresis torque. However, such chances are not herein taken into consideration.

As represented in FIG. 8, a torsional characteristic NC2 in the second stage on the positive side, having a damper effect attributed to the hysteresis torque, is thus formed.

Torsional Characteristic on Anti-Drive Side

When the first flywheel 2 begins to be rotated oppositely to the drive side (to the negative side, the R1 direction) with respect to the second flywheel 3, the first springs 49 and the second springs 48 begin to be compressed between the first flywheel 2 and the second flywheel 3. When described in more detail, in the condition of FIG. 6, the first springs 49 and the second springs 48 are compressed in the rotational direction between the first flywheel 2 and the transmission parts 33e of the second flywheel 3.

Figure 6:
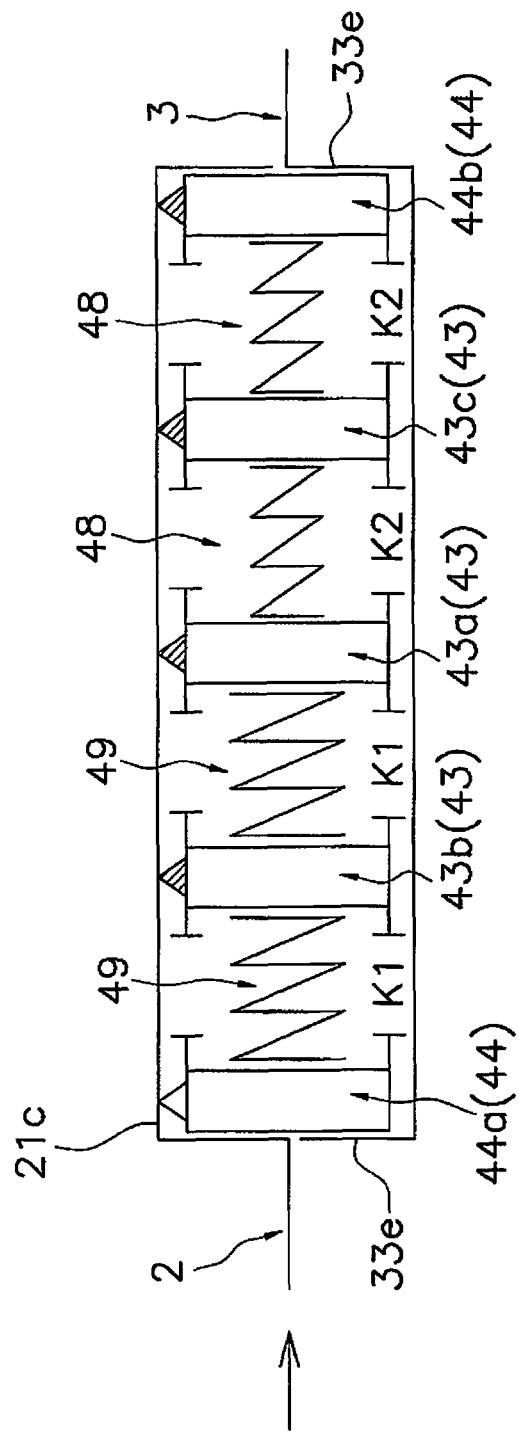
FIG. 6 is a mechanical circuit diagram according to the first exemplary embodiment (a neutral state; the circuit is being actuated in a first stage on a negative side).

Further, in this case, the first spring sheet 44 (the second end sheet 44b) and three second spring sheets 43 (the first intermediate sheet 43a, the second intermediate sheet 43b and the third intermediate sheet 43c) are pressed onto and slid against the inner peripheral surface of the tubular part 21c of the first flywheel 2 by means of centrifugal force. In FIG. 6, parts (the outer peripheral parts of the spring sheets 44 and 43) pressed onto and slid against the first flywheel 2 are depicted with hatched lines.

Accordingly, hysteresis torque is produced by the friction force produced between the respective spring sheets 44 and 43 and the inner peripheral surface of the tubular part 21c of the first flywheel 2. Thus, the hysteresis torque is produced by the friction force between the respective spring sheets 44 and 43 and the first flywheel 2.

As represented in FIG. 8, a torsional characteristic NC1' in the first stage on the negative side, having an attenuation effect attributed to the hysteresis torque, is thus formed.

Figure 7:
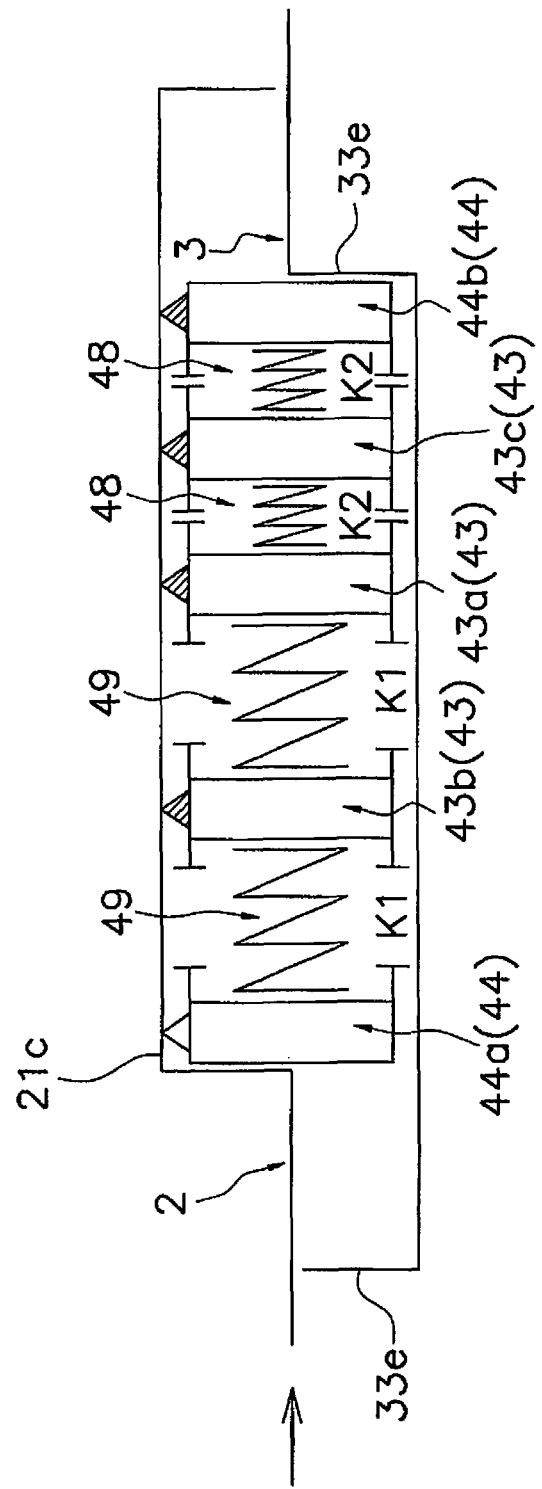
FIG. 7 is a mechanical circuit diagram according to the first exemplary embodiment (the circuit is being actuated in a second stage on the negative side).

Next, when the first flywheel 2 is further rotated with respect to the second flywheel 3, as illustrated in FIG. 7, the tubular part 44c of the second end sheet 44b and one tubular part 43d of the third intermediate sheet 43c are contacted in the rotational direction. Further, the other tubular part 43d of the third intermediate sheet 43c and one tubular part 43d of the first intermediate sheet 43a are contacted in the rotational direction. Specifically, adjacent two tubular parts 43d are contacted to each other at the radially outer parts thereof. Thus, power is transmitted from the first flywheel 2 to the second flywheel 3 through two first springs 49 while the tubular part 44c of the second end sheet 44b and one tubular part 43d of the third intermediate sheet 43c are contacted; and further, the other tubular part 43d of the third intermediate sheet 43c and one tubular part 43d of the first intermediate sheet 43a are contacted.

In the condition, one first spring 49 disposed between the first end sheet 44a and the second intermediate sheet 43b and the other first spring 49 disposed between the second intermediate sheet 43b and the first intermediate sheet 43a are to be compressed. Further, at this time, the first spring sheet 44 (the second end sheet 44b) and three second spring sheets 43 (the first intermediate sheet 43a, the second intermediate sheet 43b and the third intermediate sheet 43c) are pressed onto and slid against the inner peripheral surface of the tubular part 21c of the first flywheel 2 by means of centrifugal force. In FIG. 7, parts (the outer peripheral parts of the spring sheets 44 and 43) pressed onto and slid against the first flywheel 2 are depicted with hatched lines.

Accordingly, hysteresis torque is produced by the friction force produced between the respective spring sheets 44 and 43 and the inner peripheral surface of the tubular part 21c of the first flywheel 2. Thus, the hysteresis torque is produced by the friction force produced between the respective spring sheets 44 and 43 and the first flywheel 2.

In this case, three sheets (the second end sheet 44b, the third intermediate sheet 43c and the first intermediate sheet 43a) are contacted. However, while being thus contacted to each other, the three sheets are pressed onto and slid against the inner peripheral surface of the tubular part 21c of the first flywheel 2. Hysteresis torque is thereby produced. Therefore, the hysteresis torque on the negative side is greater than that on the positive side. Accordingly, where the torsion angle is large, resonance inhibition performance exerted by the torsional characteristic on the negative side is greater than that exerted by the torsional characteristic on the positive side.

As represented in FIG. 8, a torsional characteristic NC2' in the second stage of the negative side, having an attenuation effect attributed to the hysteresis torque, is thus formed.

Second Exemplary Embodiment

Figure 9:
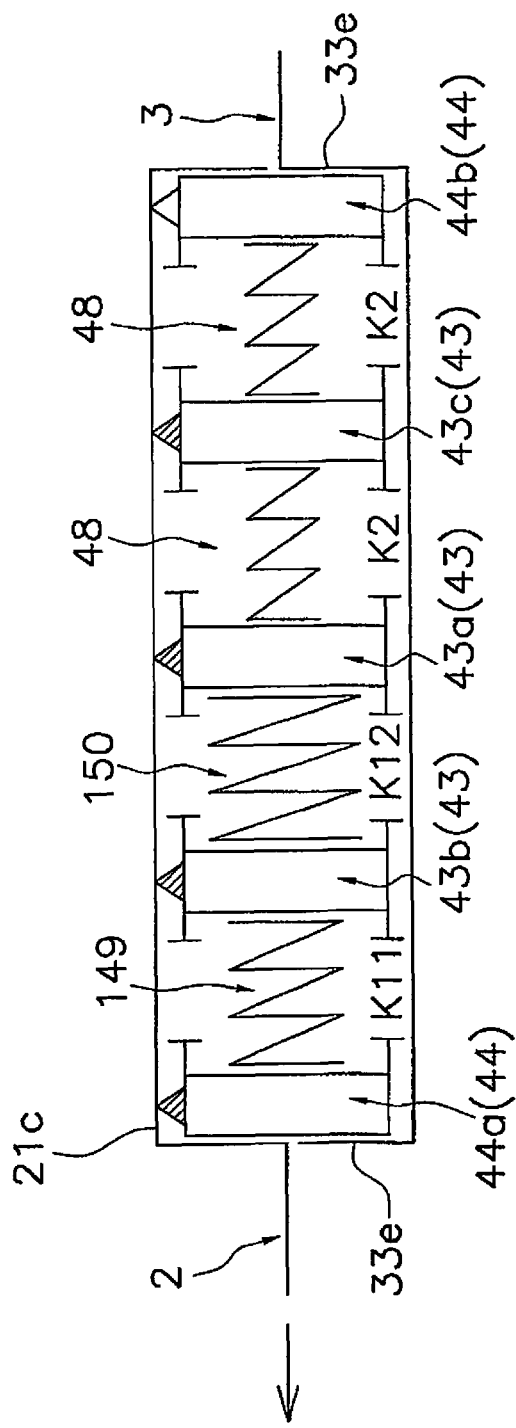
FIG. 9 is a mechanical circuit diagram according to a second exemplary embodiment (a neutral state; a circuit is being actuated in a first stage on a positive side).

Using FIGS. 9 to 15, explanation will be made for an action of the flywheel assembly 1. As illustrated in FIG. 4, the first exemplary embodiment has exemplified the configuration that the magnitudes of the stiffness K1 of two first springs 49 are equal. As illustrated in FIG. 9, the second exemplary embodiment will exemplify a configuration that two first springs 149 and 150 have stiffness K11 and K12 with different magnitudes. The structure of the second exemplary embodiment is the same as that of the first exemplary embodiment except for the configuration that the two first springs 149 and 150 have the stiffness K11 and K12 with different magnitudes in the second exemplary embodiment. Therefore, explanation will not be made for the structure of the second exemplary embodiment that is the same as the structure of the first exemplary embodiment. In other words, elements not herein explained will be understood to be equivalent to the corresponding elements of the first exemplary embodiment. It should be noted that in the second exemplary embodiment, the same reference signs are assigned to elements similar to those in the first exemplary embodiment.

Explanation will be herein mainly made for the damper mechanism. As illustrated in FIGS. 9 to 14, the two first springs 149 and 150, included in the damper mechanism 4, are disposed between the first flywheel 2 and the second flywheel 3 to act in series.

The magnitude of the stiffness K11 of one first spring 149 of the two first springs 149, 150 is less than that of the stiffness K12 of the other first spring 150 of the two first springs 149, 150 (K11<K12). Thus, in the second exemplary embodiment that the two first springs 149 and 150 have different magnitudes of stiffness, the magnitudes of spring stiffness are ranked in the ascending order of each second spring 48, one first spring 149 and the other first spring 150 (K2<K11<K12).

One first spring 149 is disposed on the side to which power is inputted when the first flywheel 2 is rotated to the positive side. The other first spring 150 is disposed between one first spring 149 and one second spring 48.

One end of one first spring 149 is supported by the first end sheet 44a. The other end of one first spring 149 is supported by the second intermediate sheet 43b. On the other hand, one end of the other first spring 150 is supported by the second intermediate sheet 43b. The other end of the other first spring 150 is supported by the first intermediate sheet 43a.

One first spring 149 is disposed on the side to which power is inputted when the first flywheel 2 is rotated to the positive side. One first spring 149 is set such that the magnitude of its stiffness K11 is less than that of the stiffness K12 of the other first spring 150 and is greater than that of the stiffness K2 of the second spring 48. One first spring 149 is elastically deformed along the first center axis C1. The first center axis C1 is herein a center axis set based on the outer contour of one first spring 149 (see FIG. 1).

The other first spring 150 includes the main spring 45 and the subsidiary spring 46 (see FIG. 1). The subsidiary spring 46 is disposed inside the main spring 45 to act in parallel thereto. The other first spring 150 has the first center axis C1 extending roughly along the rotational direction. The first spring 150 is elastically deformed along the first center axis C1. The first center axis C1 is herein a center axis set based on the outer contour of the first spring 150.

Explanation will be hereinafter made for an action of the flywheel assembly 1 thus structured. It should be noted that the flywheel assembly 1 according to the present exemplary embodiment includes two spring groups. A single spring group is composed of the two first springs 149, 150 and the two second springs 48. Explanation will be herein made by focusing on a single spring group in order to make the explanation easy.

The flywheel assembly 1 is set in a state illustrated in FIG. 9 in the neutral state that power is not being transmitted to the clutch disc assembly through the flywheel assembly 1. When the clutch disc assembly is pressed onto the second flywheel 3 in the state, power is transmitted from the engine to the transmission through the flywheel assembly 1 and the clutch disc assembly.

Drive-Side Torsional Characteristic

Figure 15:
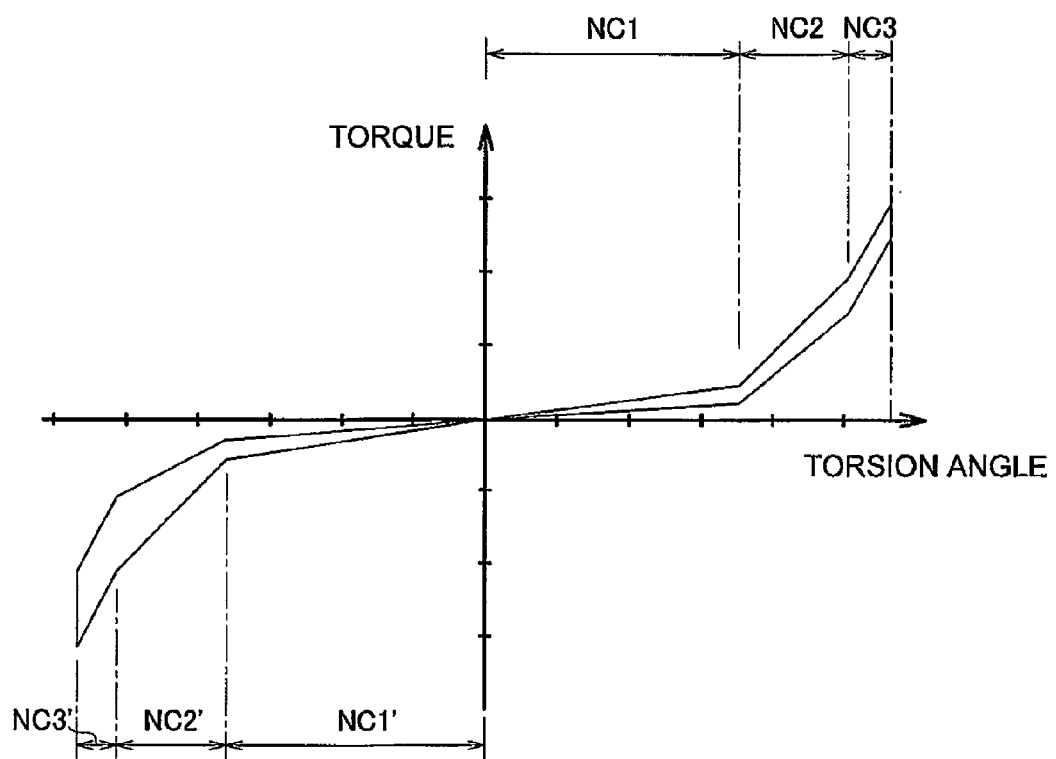
FIG. 15 is a torsional characteristic diagram according to the second exemplary embodiment.

First, power of the engine is inputted into the flywheel assembly 1, and the first flywheel 2 begins to be rotated to the drive side (the positive side) with respect to the second flywheel 3. In this case, as represented in FIG. 15, the torsional characteristic NC1 in the first stage on the positive side is formed similarly to the first exemplary embodiment. The torsional characteristic NC1 in the first stage on the positive side has an attenuation effect including hysteresis torque by the four spring sheets 44 and 43 (hatched in FIG. 9).

Figure 10:
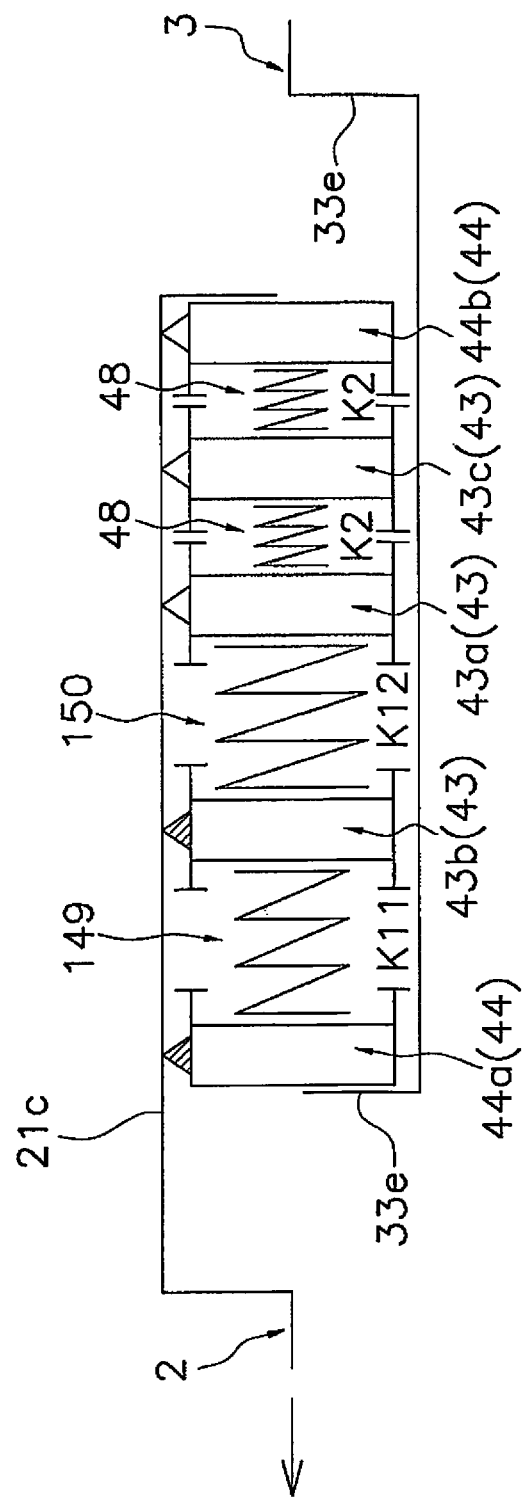
FIG. 10 is a mechanical circuit diagram according to the second exemplary embodiment (the circuit is being actuated in a second stage on the positive side).

Next, when the first flywheel 2 is further rotated with respect to the second flywheel 3, as illustrated in FIG. 10, power is transmitted from the first flywheel 2 to the second flywheel 3 through the two first springs 149 and 150 in the condition that the second end sheet 44b and the third intermediate sheet 43c are contacted while the third intermediate sheet 43c and the first intermediate sheet 43a are contacted. In this case, as represented in FIG. 15, the torsional characteristic NC2 in the second stage on the positive side, having an attenuation effect attributed to the hysteresis torque by the first end sheet 44a and the second intermediate sheet 43b (hatched in FIG. 10), is formed similarly to the first exemplary embodiment.

Figure 11:
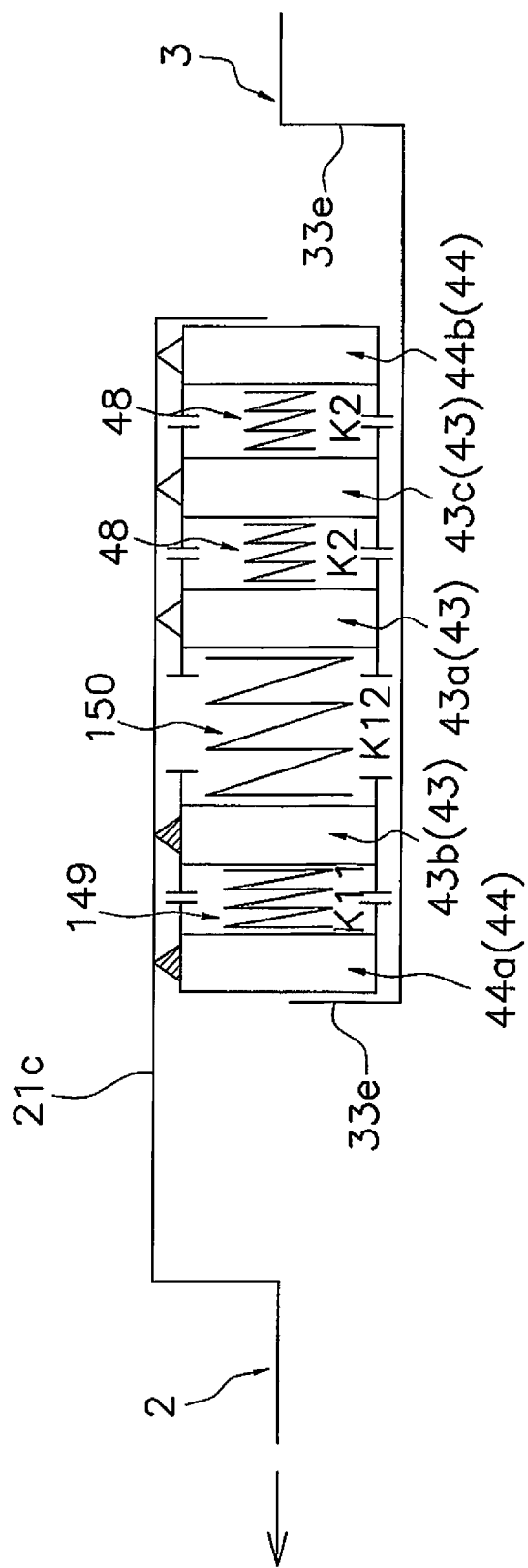
FIG. 11 is a mechanical circuit diagram according to the second exemplary embodiment (the circuit is being actuated in a third stage on the positive side).

Subsequently, when the first flywheel 2 is further rotated with respect to the second flywheel 3, the first end sheet 44a and the second intermediate sheet 43b are also contacted as illustrated in FIG. 11. Accordingly, power is transmitted from the first flywheel 2 to the second flywheel 3 through the other first spring 150 in the condition that the second end sheet 44b and the third intermediate sheet 43c are contacted; the third intermediate sheet 43c and the first intermediate sheet 43a are contacted; and the first end sheet 44a and the second intermediate sheet 43b are contacted.

In this case, the first end sheet 44a and the second intermediate sheet 43b are pressed onto and slid against the inner peripheral surface of the tubular part 21c of the first flywheel 2, while being contacted to each other. In other words, hysteresis torque is produced by the friction of the first end sheet 44a and the second intermediate sheet 43b (hatched in FIG. 11) against the first flywheel 2. It should be noted that the second end sheet 44b, the third intermediate sheet 93c and the first intermediate sheet 43a are not slid against the first flywheel 2. Hence, hysteresis torque is not produced by these sheets.

Thus, a torsional characteristic NC3 in the third stage on the positive side, having an attenuation effect attributed to the hysteresis torque by the first end sheet 44a and the second intermediate sheet 43b (hatched in FIG. 11), is formed.

Anti-Drive Side Torsional Characteristic

Figure 12:
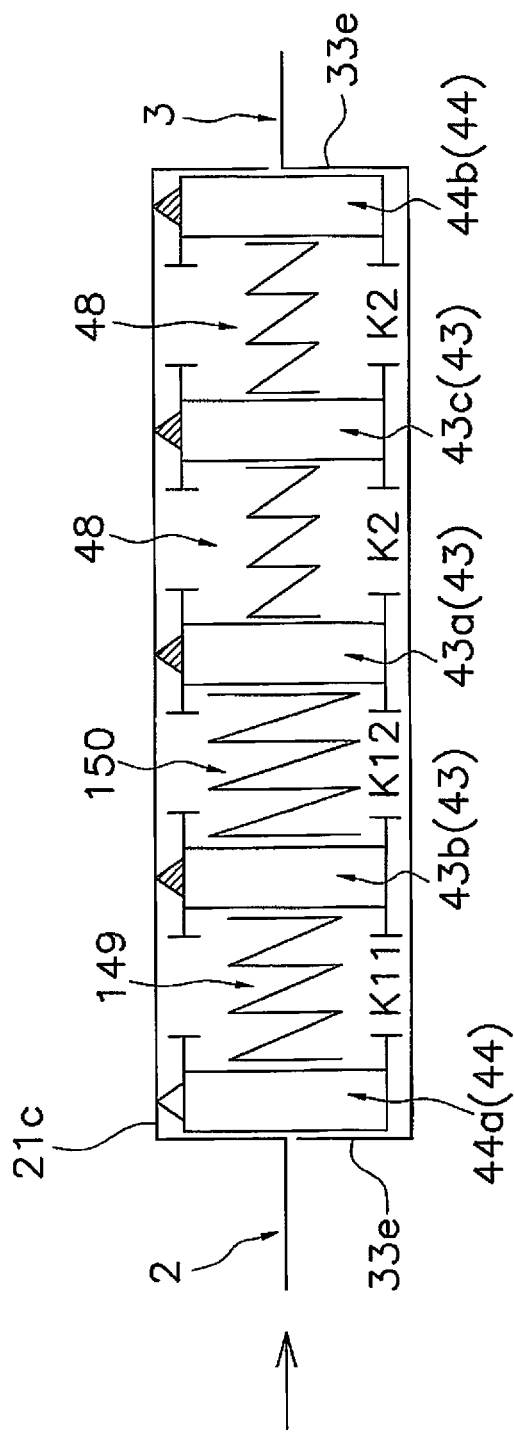
FIG. 12 is a mechanical circuit diagram according to the second exemplary embodiment (a neutral state; the circuit is being actuated in a first stage on a negative side).

When the first flywheel 2 begins to be rotated oppositely to the drive side (to the anti-drive side, the negative side) with respect to the second flywheel 3 in the condition illustrated in FIG. 12, the first springs 149 and 150 and the second springs 48 begin to be compressed between the first flywheel 2 and the second flywheel 3. In this case, the torsional characteristic NC1' in the first stage on the negative side is formed similarly to the first exemplary embodiment. The torsional characteristic NC1' in the first stage on the negative side has an attenuation effect including hysteresis torque attributed to the four spring sheets 44 and 43 (hatched in FIG. 12).

Figure 13:
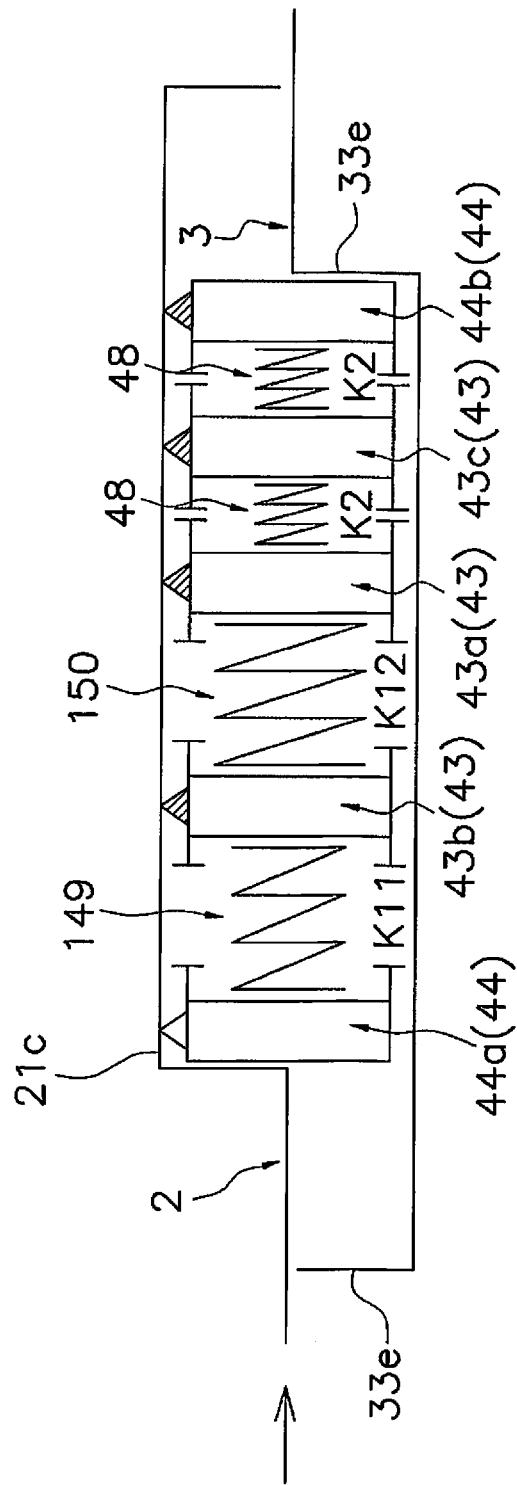
FIG. 13 is a mechanical circuit diagram according to the second exemplary embodiment (the circuit is being actuated in a second stage on the negative side).

Next, when the first flywheel 2 is further rotated with respect to the second flywheel 3, as illustrated in FIG. 13, the second end sheet 44b and the third intermediate sheet 43c are contacted, while the third intermediate sheet 43c and the first intermediate sheet 43a are contacted. In the condition, power is transmitted from the first flywheel 2 to the second flywheel 3 through the two first springs 149 and 150. In this case, as represented in FIG. 15, the torsional characteristic in the second stage on the negative side is formed similarly to the first exemplary embodiment. The torsional characteristic in the second stage on the negative side has an attenuation effect including hysteresis torque attributed to the four spring sheets 44 and 43 (hatched in FIG. 13).

In this case, three sheets (the second end sheet 44b, the third intermediate sheet 43c and the first intermediate sheet 43a) are contacted, and are pressed onto and slid against the inner peripheral surface of the tubular part 21c of the first flywheel 2 while being contacted to each other. Hysteresis torque is thereby produced. Therefore, the hysteresis torque on the negative side is greater than that on the positive side. Thus, when the torsion angle is large, resonance inhibition performance exerted by the torsional characteristic on the negative side is greater than that exerted by the torsional characteristic on the positive side.

Figure 14:
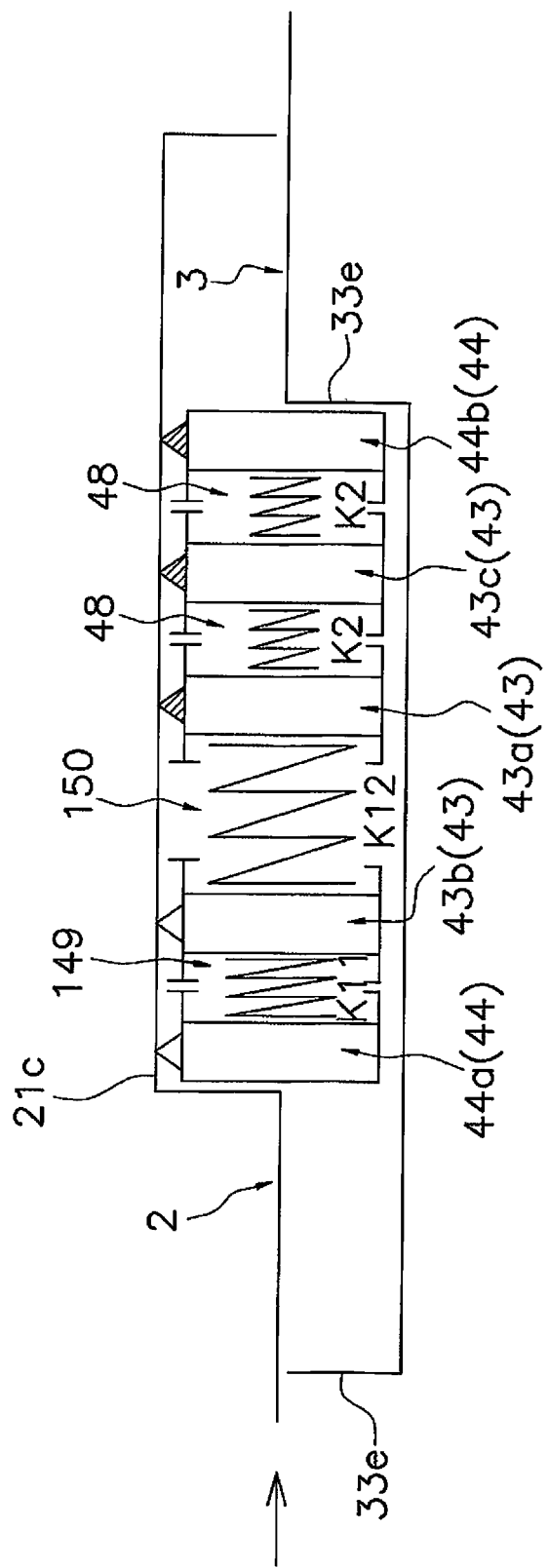
FIG. 14 is a mechanical circuit diagram according to the second exemplary embodiment (the circuit is being actuated in a third stage on the negative side).

Subsequently, when the first flywheel 2 is further rotated with respect to the second flywheel 3, the first end sheet 44a and the second intermediate sheet 43b are also contacted as illustrated in FIG. 14. Accordingly, the second end sheet 44b and the third intermediate sheet 43c are contacted; the third intermediate sheet 43c and the first intermediate sheet 43a are contacted; and further, the first end sheet 94a and the second intermediate sheet 43b are contacted. In the condition, power is transmitted from the first flywheel 2 to the second flywheel 3 through the other first spring 150. At this time, the second end sheet 44b, the third intermediate sheet 43c and the first intermediate sheet 43a are pressed onto and slid against the inner peripheral surface of the tubular part 21c of the first flywheel 2. In other words, hysteresis torque is produced by the friction of the second end sheet 44b, the third intermediate sheet 43c and the first intermediate sheet 43a (hatched in FIG. 14) against the first flywheel 2.

The first end sheet 44a and the second intermediate sheet 43b are not herein slid against the first flywheel 2. Hence, hysteresis torque is not produced by these sheets. In other words, when the sheet members are contacted on the output side of power, hysteresis torque is not produced by these sheet members.

As described above, a torsional characteristic NC3' in the third stage on the negative side, having an attenuation effect attributed to the hysteresis torque by the second end sheet 44b, the third intermediate sheet 43c and the first intermediate sheet 43a (hatched in FIG. 14), is formed.

It should be noted that in this case, three sheets (the second end sheet 44b, the third intermediate sheet 43c and the first intermediate sheet 43a) are contacted, and are contacted onto and slid against the inner peripheral surface of the tubular part 21c of the first flywheel 2 while being contacted to each other. Hysteresis torque is thereby produced. Therefore, the hysteresis torque on the negative side is greater than that on the positive side. Thus, when the torsion angle is large, resonance inhibition performance exerted by the torsional characteristic on the negative side is greater than that exerted by the torsional characteristic on the positive side.

Other Exemplary Embodiments

The present invention is not limited to the aforementioned exemplary embodiments, and a variety of changes and modifications can be made without departing from the scope of the present invention.

The aforementioned exemplary embodiments have exemplified configurations that the two second springs 48 have the same magnitude of stiffness K2 in each spring group. However, the two second springs 48 may have different magnitudes of stiffness K2 as long as the magnitudes of stiffness K2 of the two second springs 48 are less than those of stiffness K1 (K11 and K12) of the first springs 49. In this case, the torsional characteristic in the first stage is changed into a two-stage torsional characteristic (not represented in the drawings). Even in this case, it is possible to achieve advantageous effects similar to those described above.

The aforementioned exemplary embodiments have exemplified the structures that the flywheel assembly 1 includes two first springs 49 and two second springs 48 in each spring group. However, the number of the first springs 49 and the number of the second springs 48 may be arbitrarily set as long as the magnitudes of stiffness K2 of the second springs 48 are less than those of stiffness K1 (K11 and K12) of the first springs 49. Even in this case, it is possible to achieve advantageous effects similar to those described above.

The aforementioned exemplary embodiments have exemplified the structures that two second springs 48 have the same magnitude of stiffness in the flywheel assembly 1. However, the two second springs 48 may have different magnitudes of stiffness. In this case, it is possible to change the timing that the spring sheets, disposed on the both ends of each second spring 48, are contacted. Thus, a multi-stage characteristic can be easily formed.

Figure 16:
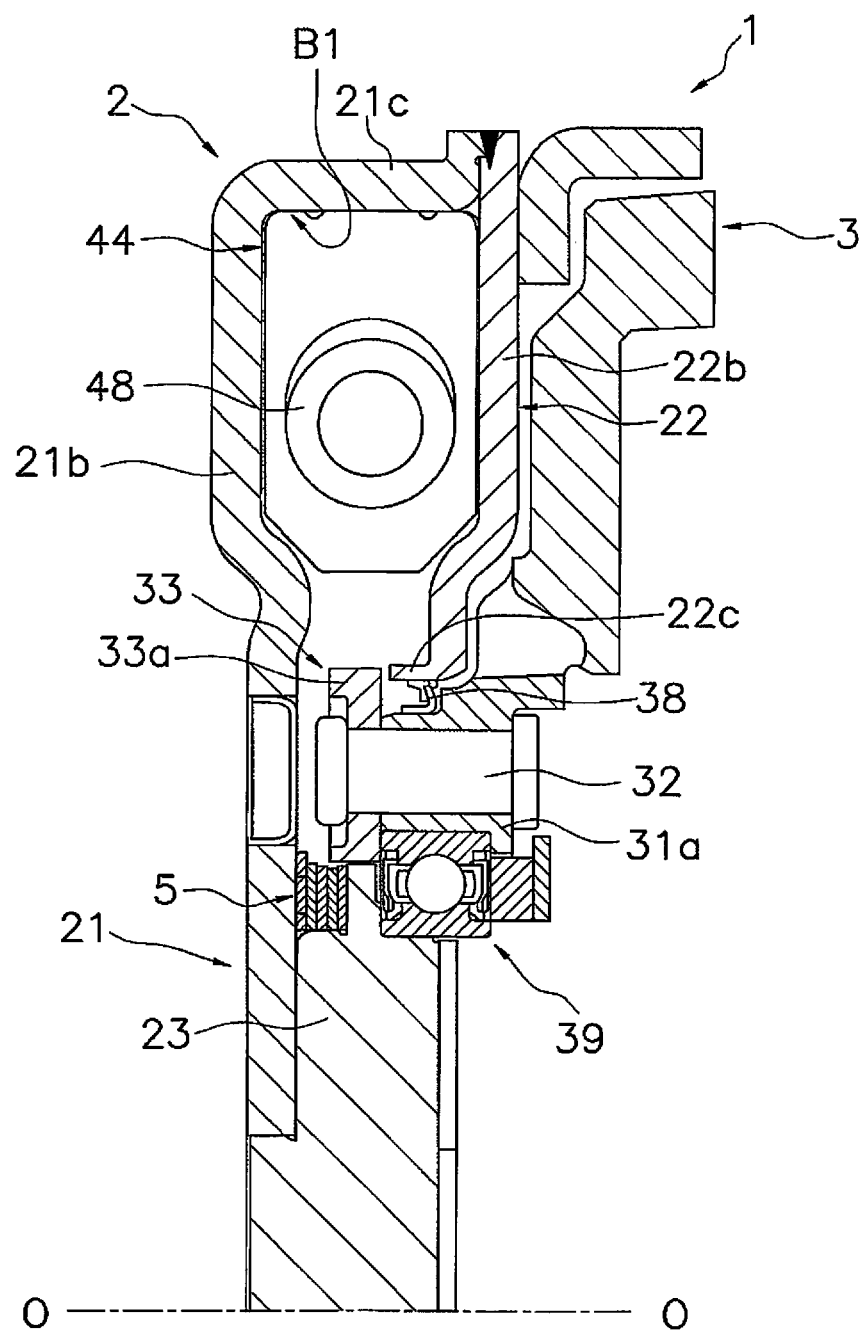
FIG. 16 is a partial enlarged view of a flywheel assembly according to another exemplary embodiment (where the flywheel assembly includes a friction generating mechanism).

The flywheel assembly 1 according to the aforementioned exemplary embodiments may further include a friction generating mechanism. As illustrated in FIG. 16, a friction generating mechanism 5 is disposed between the support member 23 and the first plate 21. The friction generating mechanism 5 is configured to generate frictional resistance in the position between the support member 23 and the first plate 21. In this case, an attenuation effect is exerted by hysteresis torque by the four spring sheets 44 and 43 and that by the friction generating mechanism 5. Even when such a structure is produced, it is possible to achieve advantageous effects similar to those described above.

In the aforementioned exemplary embodiments, the transmission torque of each second spring 48 is set to be less than that of each first spring 49 by setting the magnitude of stiffness of each second springs 48 to be less than that of stiffness of each first spring 49 and by disposing the first spring sheets 44 and the second spring sheets 43 as described above.

Instead of the above, the transmission torque of each second spring 48 may be set to be less than that of each first spring 49 by setting the interval of two sheet members disposed on the both ends of each second spring 48 to be less than that of two sheet members disposed on the both ends of each first spring 49.

Figure 17:
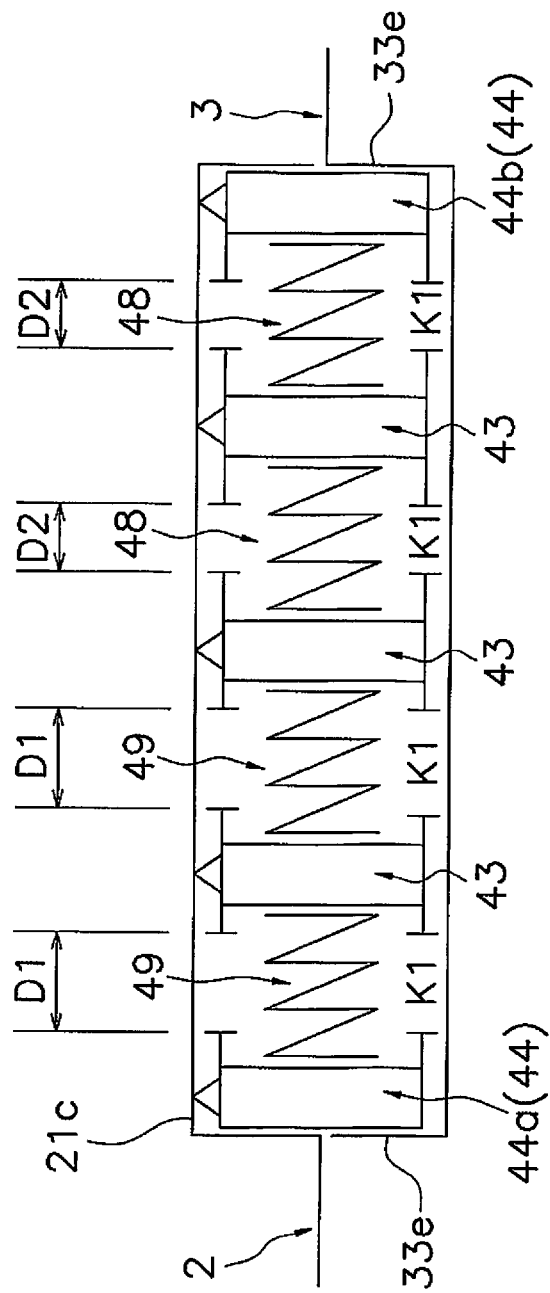
FIG. 17 is a mechanical circuit diagram of a flywheel assembly according to yet another exemplary embodiment (a neutral state; a two-stage torsional characteristic).

In this case, for instance, as illustrated in FIG. 17, the spring sheets 43 and 44 are structured such that a second interval D2 of two spring sheets 43 (or two spring sheets 44b and 43) disposed on the both ends of each second spring 48 is set to be less than a first interval D1 of two spring sheets 43 (or two spring sheets 44a and 43) disposed on the both ends of each first spring 49 (D2<D1). In FIG. 17, for instance, the spring sheets 43 and 44 are formed such that the circumferential lengths of the outer peripheral parts of the spring sheets opposed to each other on the both ends of each second spring 48 is set to be greater than those of the outer peripheral parts of the second spring sheets 43 in the aforementioned exemplary embodiments.

FIG. 17 exemplifies a configuration that the magnitude of stiffness of each second spring 48 is equal to that of stiffness of each first spring 49. However, the respective springs are only required to have a configuration that the magnitude of stiffness of each second spring 48 is set to be less than or equal to that of stiffness of each first spring 49. It should be noted that the first interval D1 and the second interval D2 are the circumferential intervals between the outer peripheral parts of the adjacent spring sheets 43 (or the adjacent spring sheets 44 and 43).

FIG. 17 exemplifies the structure that the spring sheets 43 and 44 are formed such that the second interval D2 is set to be less than the first interval D1. However, the respective springs 48 and 49 may be formed such that the second interval D2 is set to be less than the first interval D1. In this case, even when the spring sheets 43 and 44 similar to those of the aforementioned exemplary embodiment are used, the second interval D2 can be set to be less than the first interval D1 by setting the length of each second spring 48 to be less than that of each first spring 49.

With the flywheel assembly 1 structured as described above, a two-stage torsional characteristic can be set similarly to the first exemplary embodiment. Further, it is possible to achieve advantageous effects similar to those achieved by the first exemplary embodiment.

Figure 18:
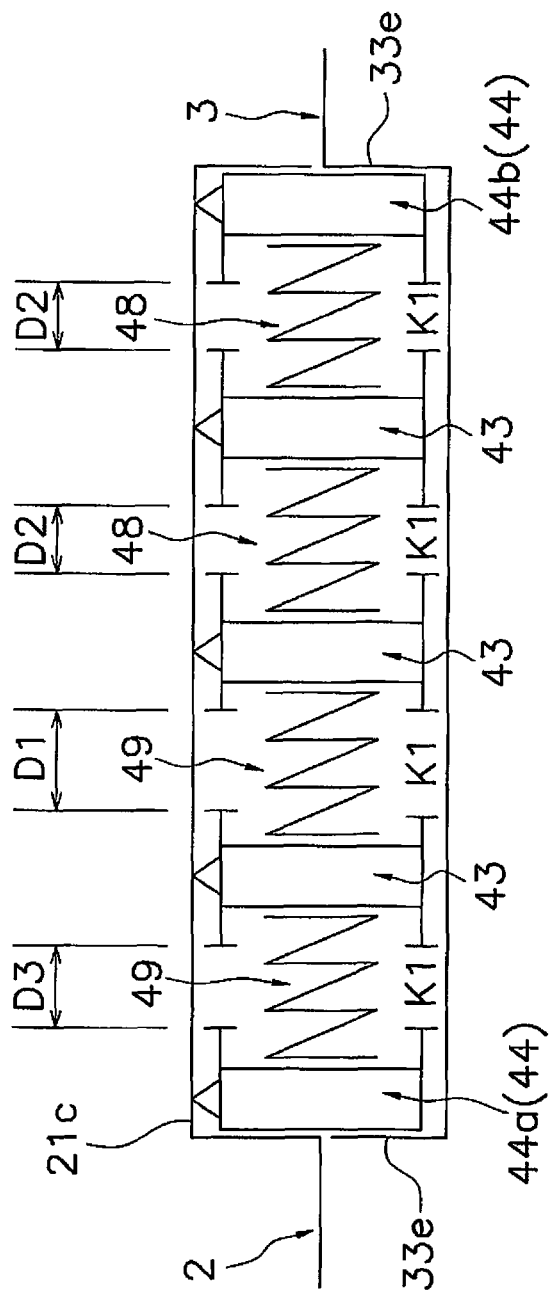
FIG. 18 is a mechanical circuit diagram of a flywheel assembly according to further yet another exemplary embodiment (a neutral state; a three-stage torsional characteristic).

Further as an alternative example, as illustrated in FIG. 18, it is possible to set a three-stage torsional characteristic similarly to the aforementioned second exemplary embodiment by structuring the flywheel assembly 1 such that the magnitudes of intervals are ranked in the descending order of the first interval D1, the third interval D3 and the second interval D2 (D1>D3>D2). Similarly to the explanation relevant to FIG. 17, the third interval D3 is adjusted by at least either of the shapes of the spring sheets 43 and 44a and the length of the spring 49. It should be noted that the other elements except for the third interval D3 are the same as those illustrated in FIG. 17, and therefore, detailed explanation thereof will not be hereinafter made. Even in this case, it is possible to achieve advantageous effects similar to those achieved by the aforementioned second exemplary embodiment.

The present invention is widely applicable to flywheel assemblies.

The invention claimed is:

1. A flywheel assembly, comprising:
   a first rotary member;
   a second rotary member disposed to be rotatable with respect to the first rotary member;
   a first elastic member configured to couple elastically the first rotary member and the second rotary member in a rotational direction and disposed on a side to which an acceleration-side power of an engine is outputted, the first elastic member being one of a plurality of first elastic members and adjacent ones of the plurality of first elastic members being disposed in series;
   a second elastic member configured to couple elastically the first rotary member and the second rotary member in the rotational direction and disposed in series with the plurality of first elastic members, a magnitude of a transmission torque of the second elastic member being less than a magnitude of a transmission torque of the first elastic member;
   an end sheet member including a first end sheet member and a second end sheet member, the first end sheet member disposed between the first elastic member and at least either of the first rotary member and the second rotary member and configured to be slidable against the first rotary member, the second end sheet member disposed between the second elastic member and at least either of the first rotary member and the second rotary member and configured to be slidable against the first rotary member; and
   an intermediate sheet member including a first intermediate sheet member and a second intermediate sheet member, the first intermediate sheet member disposed between the first elastic member and the second elastic member and configured to be slidable against the first rotary member, and the second intermediate sheet member being disposed between the adjacent ones of the plurality of first elastic members.

2. The flywheel assembly recited in claim 1, wherein a magnitude of the transmission torque of at least any one of the plurality of first elastic members is less than a magnitude of the transmission torque of each of the rest of the plurality of first elastic members.

3. The flywheel assembly recited in claim 2, wherein the second elastic member is one of a plurality of second elastic members and adjacent ones of the plurality of second elastic members are disposed in series, and the intermediate sheet member further includes a third intermediate sheet member, the third intermediate sheet member disposed between the adjacent ones of the plurality of second elastic members.

4. The flywheel assembly recited in claim 3, wherein a magnitude of the transmission torque of at least any one of the plurality of second elastic members is less than a magnitude of the transmission torque of each of the rest of the plurality of second elastic members.

5. The flywheel assembly recited in claim 4, wherein amongst the sheet members, adjacent ones disposed on the both sides of the second elastic member are configured to be contacted to each other when a rotational angle of the second rotary member with respect to the first rotary member becomes a predetermined angle.

6. The flywheel assembly recited in claim 1, wherein
the second elastic member is one of a plurality of second elastic members and adjacent ones of the plurality of second elastic members are disposed in series, and
the intermediate sheet member further includes a third intermediate sheet member, the third intermediate sheet member disposed between the adjacent ones of the plurality of second elastic members.

7. The flywheel assembly recited in claim 6, wherein
a magnitude of the transmission torque of at least any one of the plurality of second elastic members is less than a magnitude of the transmission torque of each of the rest of the plurality of second elastic members.

8. The flywheel assembly recited in claim 1, wherein
amongst the sheet members, adjacent ones disposed on the both sides of the second elastic member are configured to be contacted to each other when a rotational angle of the second rotary member with respect to the first rotary member becomes a predetermined angle.

\* \* \* \* \*